(12) United States Patent
Walster

(10) Patent No.: US 6,842,764 B2
(45) Date of Patent: *Jan. 11, 2005

(54) MINIMUM AND MAXIMUM OPERATIONS TO FACILITATE INTERVAL MULTIPLICATION AND/OR INTERVAL DIVISION

(75) Inventor: G. William Walster, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 715 days.

This patent is subject to a terminal disclaimer.

(21) Appl. No.: 09/818,021

(22) Filed: Mar. 26, 2001

(65) Prior Publication Data

US 2002/0194232 A1 Dec. 19, 2002

(51) Int. Cl.[7] .................................................. G06F 7/38
(52) U.S. Cl. ...................................... 708/207; 708/495
(58) Field of Search ............................... 708/207, 495, 708/503, 504

(56) References Cited

U.S. PATENT DOCUMENTS

| | | | | |
|---|---|---|---|---|
| RE33,629 E | * | 7/1991 | Palmer et al. | 708/510 |
| 6,466,924 B1 | * | 10/2002 | Tateishi et al. | 706/15 |
| 6,629,120 B1 | * | 9/2003 | Walster et al. | 708/620 |
| 6,658,444 B1 | * | 12/2003 | Walster et al. | 708/504 |

OTHER PUBLICATIONS

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63–78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152–147. http://www.netlib.org/toms/681.

R. B. Kearfott, M. Dawande, K.S. Du, and C. Hu, "Algorithm 737: INTLIB. A Portable Fortran 737 Interval Standard Function Library," ACM Trans. Math. Software, 20, vol. 4, Dec. 1994, pp. 447–458.

R. B. Kearfott and G.W. Walster, "On Stopping Criteria in Verified Nonlinear Systems or Optimization Algorithms," ACM Trans. Math. Software, 26, vol. 3, Sep. 2000, pp. 323–351. The publication itself says Received: Jul. 1999; revised: Mar. 2000; accepted: Mar. 2000. http://interval.louisiana.edu/preprints.html.

(List continued on next page.)

*Primary Examiner*—Chuong Dinh Ngo
(74) *Attorney, Agent, or Firm*—Park, Vaughan & Fleming, LLP

(57) ABSTRACT

One embodiment of the present invention provides a system for performing a minimum/maximum computation for an interval operation. The system operates by receiving at least four floating-point numbers, including a first floating-point number, a second floating-point number, a third floating-point number and a fourth floating-point number. Next, the system computes a minimum/maximum of the at least four floating-point numbers, wherein if the at least four floating-point numbers include one or two default NaN (not-a-number) values and the remaining values are not default NaN values, the default NaN values are ignored in computing the minimum/maximum.

16 Claims, 4 Drawing Sheets

OTHER PUBLICATIONS

R.E. Moore and S.T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of Parameter-Dependent Systems of Euqations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsevier, 1994, pp. 63–136.

* cited by examiner

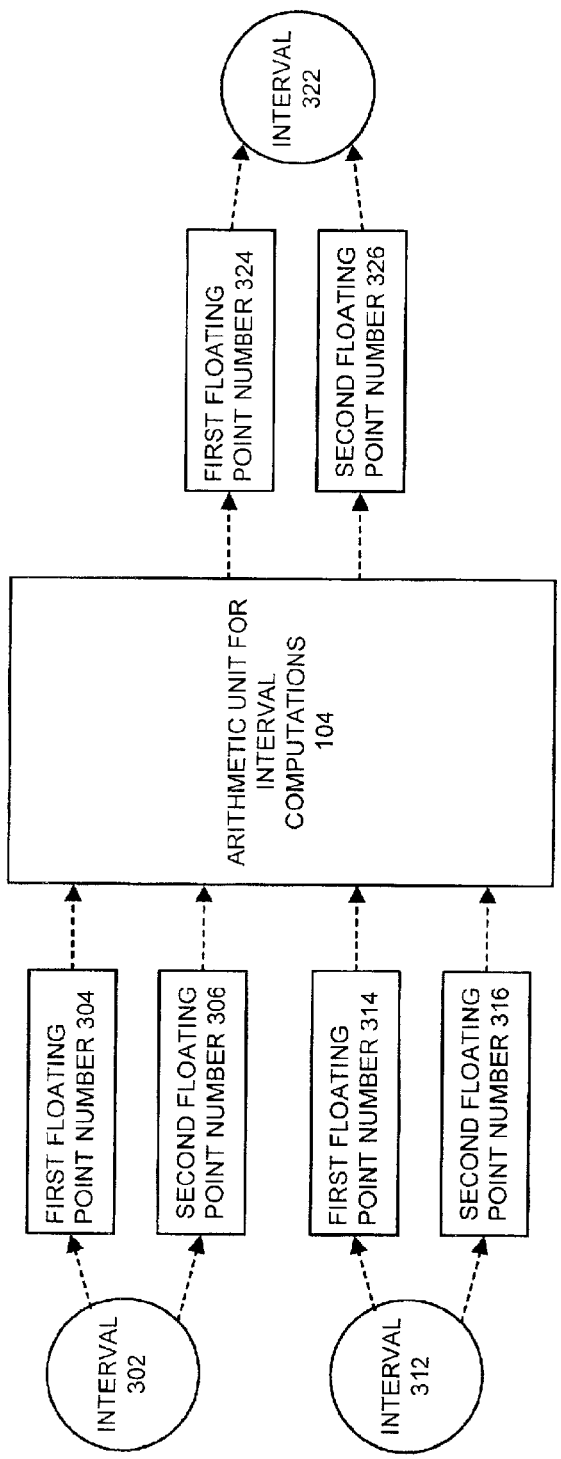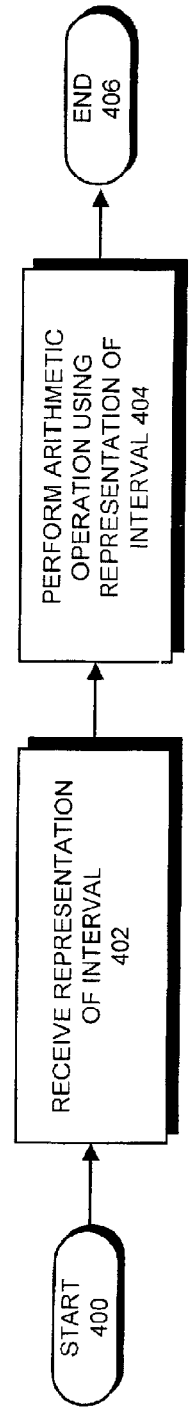
FIG. 3
FIG. 4

$$X \equiv [\underline{x}, \bar{x}] = \{x \in \Re^* | \underline{x} \leq x \leq \bar{x}\}$$

$$Y \equiv [\underline{y}, \bar{y}] = \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [min(\downarrow \underline{x} \times \underline{y}, \underline{x} \times \bar{y}, \bar{x} \times \underline{y}, \bar{x} \times \bar{y}), max(\uparrow \underline{x} \times \underline{y}, \underline{x} \times \bar{y}, \bar{x} \times \underline{y}, \bar{x} \times \bar{y})]$ (4) $X / Y = [min(\downarrow \underline{x} / \underline{y}, \underline{x} / \bar{y}, \bar{x} / \underline{y}, \bar{x} / \bar{y}), max(\uparrow \underline{x} / \underline{y}, \underline{x} / \bar{y}, \bar{x} / \underline{y}, \bar{x} / \bar{y})], \text{ if } 0 \notin Y$ $X / Y = \Re^*, \text{ if } 0 \in Y$

FIG. 5

| INTERVAL | REPRESENTATION | |
|---|---|---|
| [empty] | $[NaN_\emptyset, NaN_\emptyset]$ | (1) |
| $[-\infty, +\infty]$ | $[-inf, +inf]$ | (2) |
| $\{-\infty, +\infty\}$ | $[+inf, -inf]$ | (3) |
| $[-\delta, b]$, $-fp\_max \leq b \leq +fp\_max$ | $[-inf, B]$ | (4) |
| $[a, b]$, $a < b$ | $[A, B]$ | (5) |
| $[a, 0]$, $-fp\_max \leq a \leq -fp\_min$ | $[A, +0]$ | (6) |
| $[0, 0]$ | $[-0, +0]$ | (7) |
| $[\epsilon, b]$, $+fp\_min \leq b \leq +fp\_max$ | $[+0, B]$ | (8) |
| $[a, -\epsilon]$, $-fp\_max \leq a \leq -fp\_min$ | $[A, -0]$ | (9) |
| $[0, b]$, $+fp\_min \leq b \leq +fp\_max$ | $[-0, B]$ | (10) |
| $[a, +\delta]$, $-fp\_max \leq a \leq +fp\_max$ | $[A, +inf]$ | (11) |
| $[-\infty, b]$, $-fp\_max \leq b \leq +fp\_max$ | $[+inf, B]$ | (12) |
| $[a, +\infty]$, $-fp\_max \leq a \leq +fp\_max$ | $[A, -inf]$ | (13) |
| $[-\infty, a] \cup [b, +\infty]$<br>$-fp\_max \leq a < b \leq +fp\_max$ | $[B, A]$ | (14) |

FIG. 6

MINIMUM AND MAXIMUM OPERATIONS TO FACILITATE INTERVAL MULTIPLICATION AND/OR INTERVAL DIVISION

BACKGROUND

1. Field of the Invention

The present invention relates to performing arithmetic operations on interval operands within a computer system. More specifically, the present invention relates to a method and an apparatus for performing minimum and maximum operations to facilitate interval multiplication and/or interval division operations in the "sharp" interval system. In this system, zero is distinguished from underflow and infinities are distinguished from overflow.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

However, computer systems are presently not designed to efficiently handle intervals and interval computations. Consequently, performing interval operations on a typical computer system can be hundreds of times slower than performing conventional floating-point operations. In addition, without a special representation for intervals, interval arithmetic operations fail to produce results that are as narrow as possible.

What is needed is a method and an apparatus for efficiently performing arithmetic operations on intervals with results that are as narrow as possible. (Interval results that are as narrow as possible are said to be "sharp".)

One performance problem occurs during minimum and maximum computations for interval multiplication and interval division operations. For example, the result of multiplying two intervals $[a,b] \times [c,d] = [\min(ac,ac,bc,bd), \max(ac,ad,bc,bd)]$ (with appropriate rounding).

During these minimum and maximum computations, many special cases arise. For example, the minimum and maximum computations must deal with special cases for empty intervals, underflow conditions and overflow conditions.

These special cases are presently handled through computer code that includes numerous "if" statements to detect the special cases. Unfortunately, this code for dealing with special cases can occupy a large amount of memory. This makes it impractical to insert the code for the minimum and maximum operations "inline"—as opposed to calling a function to perform the min-max operation. Moreover, executing the code for dealing with special cases can be time-consuming, thereby degrading computational performance.

What is needed is a method and apparatus for efficiently performing minimum and maximum operations for interval multiplication and/or interval division operations.

SUMMARY

One embodiment of the present invention provides a system for performing a minimum computation for an interval operation. The system operates by receiving at least four floating-point numbers, including a first floating-point number, a second floating-point number, a third floating-point number and a fourth floating-point number. Next, the system computes a minimum of the at least four floating-point numbers, wherein if the at least four floating-point numbers include one or two default NaN (not-a-number) values and the remaining values are not default NaN values, the default NaN values are ignored in computing the minimum.

In one embodiment of the present invention, the minimum is a left endpoint of a resulting interval. In this embodiment, the first floating-point number is the result of an operation between the left endpoint of a first interval and the left endpoint of a second interval; the second floating-point number is the result of the operation between the left endpoint of the first interval and the right endpoint of the second interval; the third floating-point number is the result of the operation between the right endpoint of the first interval and the left endpoint of the second interval; and the fourth floating-point number is the result of the operation between the right endpoint of the first interval and the right endpoint of the second interval.

In one embodiment of the present invention, computing the minimum involves setting the minimum to a value representing the empty interval, if any of the at least four floating-point numbers contain the value representing the empty interval. In a variation on this embodiment, the value representing the empty interval is a non-default NaN value, denoted $NaN_\emptyset$.

In one embodiment of the present invention, computing the minimum involves setting the minimum to negative infinity if the first floating-point number is a default NaN value and the fourth floating-point number is the default NaN value.

In one embodiment of the present invention, computing the minimum involves setting the minimum to negative infinity if the second floating-point number is a default NaN value and the third floating-point number is the default NaN value.

In one embodiment of the present invention, the operation can include one of a multiplication operation or a division operation.

In one embodiment of the present invention, if none of the at least four floating-point numbers is a default NaN value or a value representing the empty interval, computing the minimum involves selecting the minimum of the at least four floating-point numbers.

One embodiment of the present invention provides a system for performing a maximum computation for an interval operation. The system operates by receiving at least four floating-point numbers, including a first floating-point number, a second floating-point number, a third floating-point number and a fourth floating-point number. Next, the system computes a maximum of the at least four floating-point numbers, wherein if the at least four floating-point numbers include one or two default NaN values and the remaining values are not default NaN values, the default NaN values are ignored in computing the maximum.

In one embodiment of the present invention, the maximum is a right endpoint of a resulting interval of the interval operation.

In one embodiment of the present invention, computing the maximum involves setting the maximum to a value representing the empty interval, if any of the at least four floating-point numbers contain the value representing the empty interval.

In one embodiment of the present invention, computing the maximum involves setting the maximum to positive infinity if the first floating-point number is a default NaN value and the fourth floating-point number is the default NaN value.

In one embodiment of the present invention, computing the maximum involves setting the maximum to positive infinity if the second floating-point number is a default NaN value and the third floating-point number is the default NaN value.

In one embodiment of the present invention, if none of the at least four floating-point numbers is a default NaN value or a value representing the empty interval, computing the maximum involves selecting the maximum of the at least four floating-point numbers.

BRIEF DESCRIPTION OF THE FIGURES

FIG. 3 illustrates an arithmetic unit for interval computations in accordance with an embodiment of the present invention.

FIG. 4 is a flow chart illustrating the process of performing an interval computation in accordance with an embodiment of the present invention.

FIG. 5 illustrates four different interval operations in accordance with an embodiment of the present invention.

FIG. 6 illustrates the "Full" system for representing intervals using two floating-point numbers in accordance with an embodiment of the present invention.

Table 1 lists the possible arguments to the minimum and maximum operations and corresponding results in accordance with an embodiment of the present invention.

Table 2 illustrates the steps involved in performing a minimum operation in accordance with an embodiment of the present invention.

Table 3 illustrates the steps involved in performing a maximum operation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
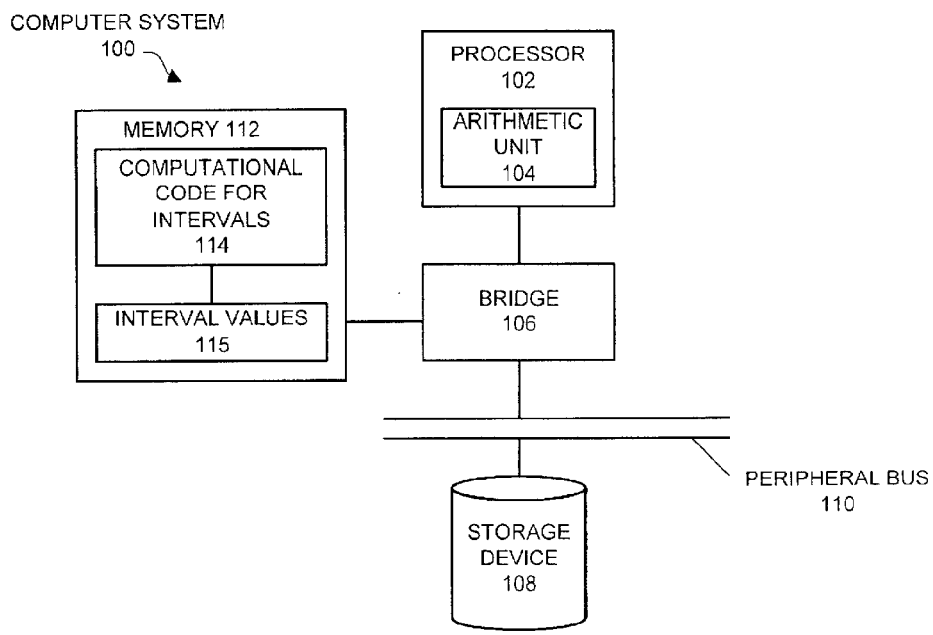
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
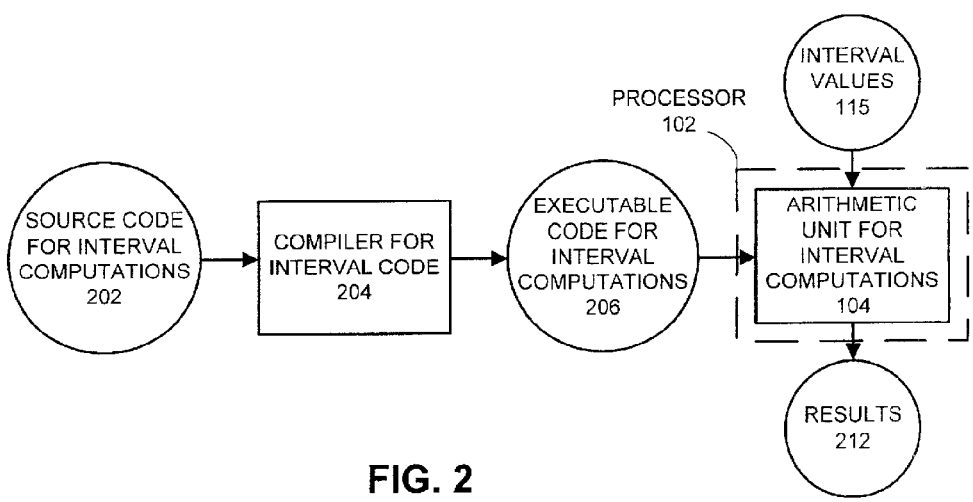
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

FIG. 3 illustrates arithmetic unit 104 for interval computations in more detail accordance with an embodiment of the present invention. Details regarding the construction of such an arithmetic unit are well known in the art. For example, see U.S. patent applicaton Ser. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X–Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Representing Intervals

FIG. 6 illustrates a scheme for representing intervals in accordance with an embodiment of the present invention. Note that the below-described scheme for representing intervals can use two floating-point numbers that adhere to the floating-point number format specified in the IEEE standard 754 for binary floating-point arithmetic. In this way, existing floating-point hardware and software can be used. However, note that the present invention can generally be applied to any floating-point representation, and is not limited to IEEE standard 754.

Also note that no additional data are required to represent exterior intervals, underflow conditions or overflow conditions. Hence, the below-described scheme minimizes the memory storage requirements for intervals, and thereby improves cache performance and data throughput. These improvements can greatly improve computational efficiency.

(1) Referring the FIG. 6, the empty interval is represented by [$NaN_{526}$, $NaN_{526}$], wherein $NaN_\emptyset$ is a non-default not-a-number (NaN). Note that IEEE standard 754 specifies a special exponent value to represent a NaN. Note that a default NaN value can be generated as the result of an undefined operation, such as dividing by zero, an underflow or an overflow. By varying the mantissa of the NaN, the NaN value can be customized to be a non-default value.

Also note that it is possible to use non-default NaN bit patterns to represent special values, such as [$-\infty, -\infty$] or [$+\infty, +\infty$].

(2) Next, the interval [$-\infty, +\infty$] can be represented by [-inf, +inf]. Note that IEEE standard 754 also specifies a representation for both positive infinity (+inf) and negative infinity (-inf).

(3) Next, the set $\{-\infty, +\infty\}$ (not the interval) is represented by [+inf, -inf].

(4) Next is the case of the negative overflow of an interval's infimum [$-\delta$, b], where $-fp\_max \leq b \leq +fp\_max$, and where $-\delta$ is a real number in the interval $-\infty < -\delta < -fp\_max$ ($-fp\_max$ is the smallest negative floating-point number). This interval is represented by [-inf, B], wherein B is any floating-point number in the interval [$-fp\_max$, $+fp\_max$]. Also note that a negative overflow is differentiated from a negative infinity by the sign bit on the left endpoint: -inf on the left endpoint represents a negative overflow; whereas +inf on the left endpoint represents negative infinity.

(5) Next, for two real machine-representable numbers a and b with $-fp\_max \leq a \leq -fp\_min$, or $+fp\_min \leq a \leq +fp\_max$ and similarly for b, and where a<b, the interval [a, b] is represented by [A, B], where A and B are floating-point representations of the finite numbers a and b.

(6) Next is the case of [a, 0] where $-fp\_max \leq a \leq -fp\_min$ ($-fp\_min$ is the closest negative floating-point number to zero). This is represented by [A, +0]. Note that IEEE standard 754 specifies a representation for positive zero (+0) as well as negative zero (-0).

(7) Next, the interval [0, 0] is represented by [-0, +0].

(8) Next is the case of the positive underflow of an interval's infimum [$\in$, b], where $+fp\_min \leq b \leq +fp\_max$ ($\in$ is a real number in the interval $0 < \in < +fp\_min$ and $+fp\_min$ is the smallest floating-point number greater than zero). This is represented by [+0, B]. Note that a positive underflow toward zero is differentiated from zero by the sign bit on the left endpoint: +0 on the left endpoint represents a positive underflow toward zero, whereas -0 on the left endpoint represents zero.

(9) Next is the case of the negative underflow of an interval's supremum [a, $-\in$], where $-fp\_max \leq a \leq -fp\_min$ ($-\in$ is a real number in the interval $-fp\_min < -\in < 0$ which results from a negative underflow toward zero). This interval is represented by [A, -0]. Note that a negative underflow toward zero is differentiated from zero by the sign bit of the right endpoint: -0 on the right endpoint represents a negative underflow toward zero, whereas +0 on the right endpoint represents zero.

(10) Next is the case of [0, b], where $+fp\_min \leq b \leq +fp\_max$. This is represented by [-0, B].

(11) Next is the case of the positive overflow of an interval's supremum [a, $\delta$], where $-fp\_max \leq a \leq +fp\_max$ and where $\delta$ is a real number in the interval $+fp\_max < \delta < +\infty$ ($+fp\_max$ is the largest positive floating-point number). This interval is represented by [A, +inf], where A is any floating-point number in the interval [$-fp\_max$, $+fp\_max$]. Note that a positive overflow is differentiated from positive infinity by the sign bit on the right endpoint: +inf on the right endpoint represents a positive overflow, whereas -inf on the right endpoint represents positive infinity.

(12) Next is the case of [$-\infty$, b], where $-fp\_max \leq b \leq +fp\_max$. This is represented by [+inf, B]. Recall from the discussion of negative overflow above that a +inf value for the left endpoint represents a negative infinity.

(13) Next is the case of [a, $+\infty$], where $-fp\_max \leq a \leq +fp\_max$. This is represented by [A, -inf]. Recall from the discussion of positive overflow above that a -inf value for the right endpoint represents a positive infinity.

(14) Next is the case of an exterior interval [$-\infty$, a]$\cup$[b, $+\infty$], where $-fp\_max \leq a < b \leq +fp\_max$. This "exterior interval" is the union of a first interval that extends from $-\infty$ to a, and a second interval that extends from b to $+\infty$, with a<b. This exterior interval is represented by [B, A], wherein A and B are both finite floating-point numbers, and A is less than B. Note that an exterior interval reverses the order of A and B to indicate the fact that it represents an exterior interval as opposed to an interior interval.

Minimum and Maximum Computations

The min-max algorithm for finite interval multiplication is:

$$[a,b] \times [c,d] = [\min(\downarrow ac, ad, bc, bd), \max(\uparrow ac, ad, bc, bd)].$$

Note that one embodiment of the present invention uses internal representations that allow existing IEEE instructions to be used to produce all the desired results, including the propagation of empty and entire intervals.

The empty interval, "$\emptyset$", and entire interval, "R*", propagate in exactly the same way, except with respect to each other, in which case the empty interval dominates. Choosing "[$NAN_\emptyset$, $NaN_\emptyset$]" to represent $\emptyset$ and "[-inf,+inf]" to represent R* facilitates their propagation and interaction. In particular, $\emptyset \times X = \emptyset$ results naturally from:

$$[NAN_\emptyset, NaN_\emptyset] \times X = [NAN_\emptyset, NaN_\emptyset]$$

where X is any interval, including "[-inf,+inf]", representing R*.

The empty interval originates only when explicitly set by interval functions or operators. Once set, $\emptyset$ propagates. On the other hand, default NaN can arise in a variety of ways, including operator-operand combinations, such as IEEE 754±0×±inf. By choosing the non-default "$NaN_\emptyset$" to represent endpoints of ø, control is maintained over the occurrence of "NaN$_\varnothing$". Because default NaN is temporarily used only in "min-max" algorithms, any saved default "NaN" must be the result of an interval implementation error or a point operation. This fact can be used to implement a validity test.

In one embodiment of the present invention, default NaNs can only arise in two different contexts, but they must be distinguished from each other and from NaN$_\varnothing$. They are: R* propagation, and underflow-overflow result tracking. To illustrate the two contexts, consider [0,0]×R* and [0,0]×[a,δ] internally represented respectively by:

$$[-0,+0] \times [-\inf,+\inf] = [-\inf,+\inf]; \text{ and}$$

$$[-0,+0] \times [a,+\inf] = [-0,+0], \text{ wherein } -\text{fp\_max} \leq a \leq +\text{fp\_max}.$$

When the context is R* propagation, all four intermediate scalar products are default NaN. When the context is underflow-overflow result tracking, at least two of the intermediate scalar products are not default NaN. When the context is ø propagation, all four intermediate scalar products are NaN$_\varnothing$. Therefore, to separate these three contexts it is sufficient to employ modified min and max functions having the properties shown in Table 1 below:

$$\min(NaN_\varnothing, NaN_\varnothing, NaN_\varnothing, NaN_\varnothing) = NaN_\varnothing$$

$$\max(NaN_\varnothing, NaN_\varnothing, NaN_\varnothing, NaN_\varnothing) = NaN_\varnothing$$

$$\min(NaN, NaN, NaN, NaN) = -\inf$$

$$\max(NaN, NaN, NaN, NaN) = +\inf$$

$$\min(X, Y, NaN, NaN) = \min(X, Y)$$

$$\max(X, Y, NaN, NaN) = \max(X, Y)$$

TABLE 1

| ac | ad | bc | bd | min | max | case |
|---|---|---|---|---|---|---|
|  |  |  |  | min(ac,ad,bc,bd) | max(ac,ad,bc,bd) | 1 |
| NaN |  |  |  | min(ad,bc,bd) | max(ad,bc,bd) | 2 |
|  | NaN |  |  | min(ac,bc,bd) | max(ac,bc,bd) | 3 |
|  |  | NaN |  | min(ac,ad,bd) | max(ac,ad,bd) | 4 |
|  |  |  | NaN | min(ac,ad,bc) | max(ac,ad,bc) | 5 |
| NaN | NaN |  |  | min(bc,bd) | max(bc,bd) | 6 |
| NaN |  | NaN |  | min(ad,bd) | max(ad,bd) | 7 |
| NaN |  |  | NaN | min(ad,bc) | max(ad,bc) | 8 |
|  | NaN | NaN |  | min(ac,bd) | max(ac,bd) | 9 |
|  | NaN |  | NaN | min(ac,bc) | max(ac,bc) | 10 |
|  |  | NaN | NaN | min(bc,bd) | max(bc,bd) | 11 |
| NaN | NaN | NaN | NaN | -inf | +inf | 12 |
| NaN$_\varnothing$ | NaN$_\varnothing$ | NaN$_\varnothing$ | NaN$_\varnothing$ | NaN$_\varnothing$ | NaN$_\varnothing$ | 13 |

The min-max version of division requires the addition of a test to check for divisors that contain zero, in which case R* is returned, provided the numerator is not empty. With only the addition of the above minimum and maximum operations, min-max multiplication and division operations can be implemented.

Min and Max Instructions

To understand the methods to compute a minimum and a maximum, presented in Table 2 below, it is helpful to list the possible arguments to the minimum and maximum operations. Note that the variables ac, ad, bc and ad can be the result of individual operand multiplications or divisions depending on the operation being performed.

TABLE 2

```
Input: ac,ad,bc,bd
Output: "Sharp" minimum
if ac==NaN_ϕ
    return NaN_ϕ                           {case 13}
if ac==NaN and ad==NaN and bc==NaN and bd==NaN
    return -inf                            {case 12}
if ac==NaN
    ac = fp_max                            {cases 2, 6, 7 & 8}
endif
if ad==NaN
    ad = fp_max                            {cases 3, 6, 9 & 10}
endif
if bc==NaN
    bc = fp_max                            {cases 4, 7, 9 & 11}
endif
if bd==NaN
    bd = fp_max                            {cases 5, 8, 10 & 11}
endif
return min(ac,ad,bc,bd)
end
```

Table 1 contains all the possibilities for multiplication. The first four columns are the four inputs, where ac, ad, bc, and bd represent the four inputs to the minimum or maximum operation, assuming X=[a,b], Y=[c,d] are being computed. A blank input cell means that this input value is neither NaN$_\varnothing$ nor NaN. The last two columns are the returned minimum and maximum results, respectively.

Because the division cases are a subset of the multiplication cases, separate min and max routines are not required for division. Table 2 contains the min algorithm. The max algorithm is exactly the same as the min algorithm except: (1) min is replaced by max everywhere in the algorithm; (2) the sign of -inf is reversed to +inf in case 12; and every instance of fp_max is replaced by -fp_max.

Also, note that the method outlined in Table 2 is suitable for efficient implementation in hardware as well as in software.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, in the method outlined in Table 2, the order of the input operands, a, b, c, and d, can be permuted to produce an equivalent min/max operation. The present invention covers all such permutations.

Additionally, the above disclosure is not intended to limit the present invention. The scope of the present invention is defined by the appended claims.

What is claimed is:

1. A computer-readable storage medium storing instructions that when executed by a computer cause the computer to perform a method for performing a minimum computation for an interval operation, the method comprising:

receiving at least four floating-point numbers, including a first floating-point number, a second floating-point number, a third floating-point number and a fourth floating-point number; and computing a minimum of the at least four floating-point numbers;

wherein if the at least four floating-point numbers include one or two default NaN (not-a-number) values and the remaining values are not default NaN values, the default NaN values are ignored in computing the minimum.

2. The computer-readable storage medium of claim 1,
wherein the minimum is a left endpoint of a resulting interval of the interval operation;
wherein the first floating-point number is the result of an operation between the left endpoint of a first interval and the left endpoint of a second interval;
wherein the second floating-point number is the result of the operation between the left endpoint of the first interval and the right endpoint of the second interval;
wherein the third floating-point number is the result of the operation between the right endpoint of the first interval and the left endpoint of the second interval; and
wherein the fourth floating-point number is the result of the operation between the right endpoint of the first interval and the right endpoint of the second interval.

3. The computer-readable storage medium of claim 1, wherein computing the minimum involves setting the minimum to a value representing the empty interval, if any of the at least four floating-point numbers contain the value representing the empty interval.

4. The computer-readable storage medium of claim 3, wherein the value representing the empty interval is a non-default NaN value.

5. The computer-readable storage medium of claim 2, wherein computing the minimum involves setting the minimum to negative infinity if the first floating-point number is a default NaN value and the fourth floating-point number is the default NaN value.

6. The computer-readable storage medium of claim 2, wherein computing the minimum involves setting the minimum to negative infinity if the second floating-point number is a default NaN value and the third floating-point number is the default NaN value.

7. The computer-readable storage medium of claim 1, wherein if none of the at least four floating-point numbers is a default NaN value or a value representing the empty interval, computing the minimum involves selecting the minimum of the at least four floating-point numbers.

8. The computer-readable storage medium of claim 2, wherein the operation can include one of a multiplication operation and a division operation.

9. A computer-readable storage medium storing instructions that when executed by a computer cause the computer to perform a method for performing a maximum computation for an interval operation, the method comprising:
receiving at least four floating-point numbers, including a first floating-point number, a second floating-point number, a third floating-point number and a fourth floating-point number; and
computing a maximum of the at least four floating-point numbers;
wherein if the at least four floating-point numbers include one or two default NaN (not-a-number) values and the remaining values are not default NaN values, the default NaN values are ignored in computing the maximum.

10. The computer-readable storage medium of claim 9,
wherein the maximum is a right endpoint of a resulting interval of the interval operation;
wherein the first floating-point number is the result of an operation between the left endpoint of a first interval and the left endpoint of a second interval;
wherein the second floating-point number is the result of the operation between the left endpoint of the first interval and the right endpoint of the second interval;
wherein the third floating-point number is the result of the operation between the right endpoint of the first interval and the left endpoint of the second interval; and
wherein the fourth floating-point number is the result of the operation between the right endpoint of the first interval and the right endpoint of the second interval.

11. The computer-readable storage medium of claim 9, wherein computing the maximum involves setting the maximum to a value representing the empty interval, if any of the at least four floating-point numbers contain the value representing the empty interval.

12. The computer-readable storage medium of claim 11, wherein the value representing the empty interval is a non-default NaN value.

13. The computer-readable storage medium of claim 10, wherein computing the maximum involves setting the maximum to positive infinity if the first floating-point number is a default NaN value and the fourth floating-point number is the default NaN value.

14. The computer-readable storage medium of claim 10, wherein computing the maximum involves setting the maximum to positive infinity if the second floating-point number is a default NaN value and the third floating-point number is the default NaN value.

15. The computer-readable storage medium of claim 9, wherein if none of the at least four floating-point numbers is a default NaN value or a value representing the empty interval, computing the maximum involves selecting the maximum of the at least four floating-point numbers.

16. The computer-readable storage medium of claim 10, wherein the operation can include one of a multiplication operation and a division operation.

* * * * *